(12) United States Patent
Takato

(10) Patent No.: US 9,994,107 B2
(45) Date of Patent: Jun. 12, 2018

(54) INSTRUMENT CLUSTER GAUGE

(75) Inventor: Kenichi Takato, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days. days.

(21) Appl. No.: 13/386,507

(22) PCT Filed: Jul. 23, 2009

(86) PCT No.: PCT/US2009/051474
§ 371 (c)(1),
(2), (4) Date: Jan. 23, 2012

(87) PCT Pub. No.: WO2011/011003
PCT Pub. Date: Jan. 27, 2011

(65) Prior Publication Data
US 2012/0120345 A1 May 17, 2012

(51) Int. Cl.
*B60K 37/02* (2006.01)
*G01D 11/28* (2006.01)
*G01D 13/26* (2006.01)

(52) U.S. Cl.
CPC .............. *B60K 37/02* (2013.01); *G01D 11/28* (2013.01); *G01D 13/265* (2013.01); *B60K 2350/1064* (2013.01); *B60K 2350/203* (2013.01); *B60K 2350/2034* (2013.01); *B60K 2350/302* (2013.01); *B60K 2350/408* (2013.01)

(58) Field of Classification Search
CPC .... B60K 2350/408; B60Q 1/00; G01D 11/28; G01D 13/04; G01D 13/22; G01D 13/265; Y10S 116/06; Y10S 116/36
USPC ............... 116/284–288, 47; 356/364; 349/62
See application file for complete search history.

(56) References Cited

U.S. PATENT DOCUMENTS

| | | | |
|---|---|---|---|
| 4,488,818 A * | 12/1984 | Saurer et al. .................... 368/71 |
| 5,949,346 A * | 9/1999 | Suzuki et al. ........... 340/815.45 |
| 6,147,933 A * | 11/2000 | Bland et al. ..................... 368/80 |
| 6,379,015 B2 | 4/2002 | Wilhelm et al. |
| 7,379,182 B2 * | 5/2008 | Han .............................. 356/364 |
| 7,501,939 B1 * | 3/2009 | Belikov et al. ............... 340/438 |
| 2005/0109261 A1 * | 5/2005 | Tanaka et al. ................ 116/300 |
| 2007/0157745 A1 * | 7/2007 | Takato et al. ................ 73/866.3 |
| 2008/0174416 A1 * | 7/2008 | Pala et al. ..................... 340/461 |
| 2008/0218326 A1 * | 9/2008 | Altomonte .................... 340/461 |
| 2009/0174682 A1 * | 7/2009 | Bowden et al. .............. 345/173 |

FOREIGN PATENT DOCUMENTS

| | | | | |
|---|---|---|---|---|
| DE | 102007039327 A1 * | 8/2008 | ............. B60K 37/02 |
| EP | 0 945 710 A1 | 9/1999 | |
| JP | 08181398 | * | 7/1996 | |
| WO | 2008/105262 A1 | 9/2008 | |

* cited by examiner

*Primary Examiner* — Peter Macchiarolo
*Assistant Examiner* — Irving A Campbell

(57) ABSTRACT

A dial gauge assembly includes a single circuit board that supports light emitting diodes for both illuminating a pointer and backlighting a liquid crystal display. The dial gauge assembly controls illumination of the pointer by switching on and off a plurality of segments disposed within the LCD.

21 Claims, 6 Drawing Sheets

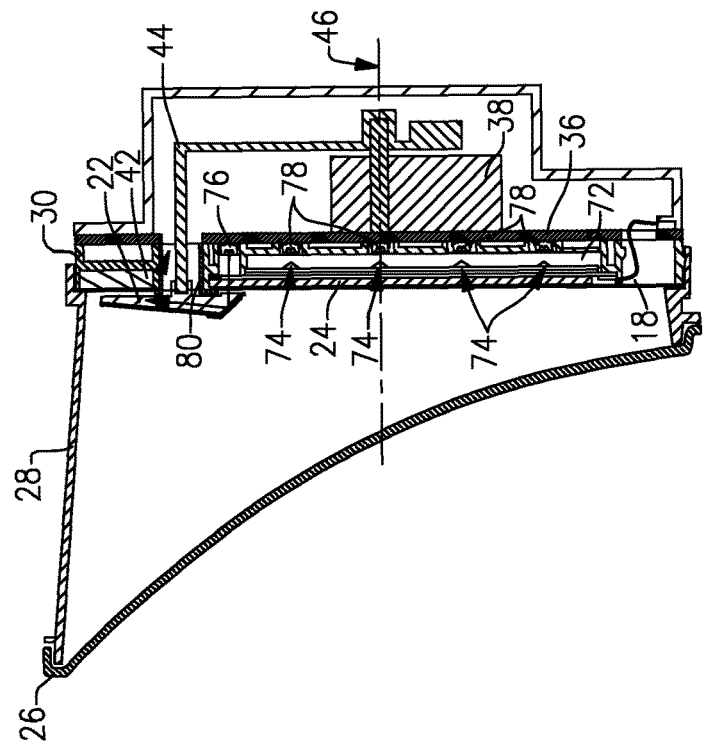

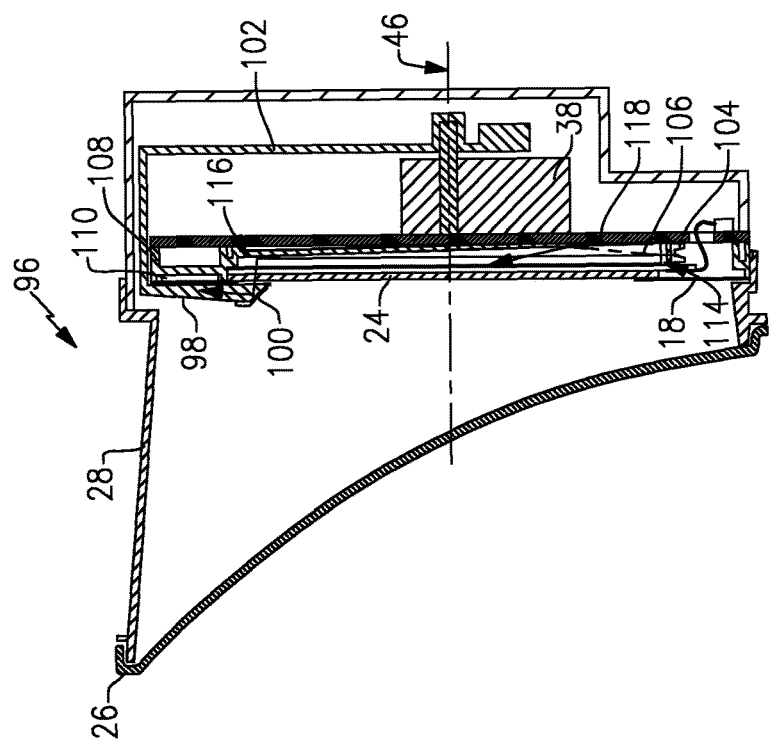

INSTRUMENT CLUSTER GAUGE

BACKGROUND OF THE INVENTION

Field of the Invention

This disclosure pertains to features and structures of a gauge for an instrument cluster. More specifically, this disclosure pertains to a structure for supporting lighting and mechanical components of an instrument gauge.

A gauge utilized for communicating a vehicle operating parameter can include a liquid crystal display (LCD) that provides the ability to vary the display of the gauge during operation. The advantages of using a LCD include the ability to display many different types of information in a limited space. Accordingly, gauges are being developed that include an LCD in a center portion of a dial gauge such as a speedometer. A pointer is provided that moves about an outer periphery of the LCD to provide a conventional display to communicate vehicle speed.

Disadvantageously, the inclusion of an LCD in the gauge complicates assembly and requires more than one printed circuit board. The various circuit boards are required to support the LCD along with light sources and motors for moving the pointer assembly. The more circuit boards required the more complex and expensive the gauge becomes.

BRIEF SUMMARY OF THE INVENTION

An exemplary dial gauge assembly includes a single circuit board that supports light emitting diodes (LEDs) for illuminating both a pointer and backlighting a liquid crystal display (LCD). The example dial gauge assembly controls illumination of the pointer by switching on and off a plurality of segments disposed within the LCD.

The example dial gauge provides an indication of vehicle speed through the use of a pointer that is rotated relative to a dial face. Disposed within a center portion of the dial gauge is the LCD. The illuminated pointer receives light from a plurality of LEDs orientated to illuminate both the LCD and the pointer. A single printed circuit board provides for mounting of a motor along with the LEDs. The LEDs broadcast light through a light guide for directing light both into the pointer and to backlight the LCD.

The example LCD includes a plurality of segments disposed annularly about its periphery. Each of these segments is selectively switchable between an on condition and an off condition. In the on condition light is allowed to pass through the LCD and onto the reflective surface of the pointer. In the off condition light from the LED is not allowed to be transmitted therethrough. A controller interprets a position of the pointer and switches on one of the plurality of segments relating to and corresponding to the position of the pointer. Once the pointer passes a segment, that segment is switched off and another segment corresponding to a current position of the pointer is switched on to allow light from a corresponding LED to light the pointer.

Accordingly, the example dial gauge assembly includes a pointer and LCD that are both illuminated by LEDs mounted to a single circuit board. Additionally, the motor is also mounted to the single common circuit board such that the number of parts is reduced and assembly simplified. Further, the LCD includes segments that control how light is transmitted into the pointer as the pointer rotates relative to the dial face.

The various features and advantages of this invention will become apparent to those skilled in the art from the following detailed description. The drawings that accompany the detailed description can be briefly described as follows.

BRIEF DESCRIPTION OF THE SEVERAL VIEWS OF THE DRAWING

FIG. 7 is a front view of another example gauge assembly.

FIG. 8 is a cross sectional of the example gauge assembly shown in FIG. 7.

FIG. 10 is a front view of another example gauge assembly.

FIG. 11 is a cross-sectional view of the example gauge assembly shown in FIG. 10.

DESCRIPTION OF THE INVENTION

Figure 1:
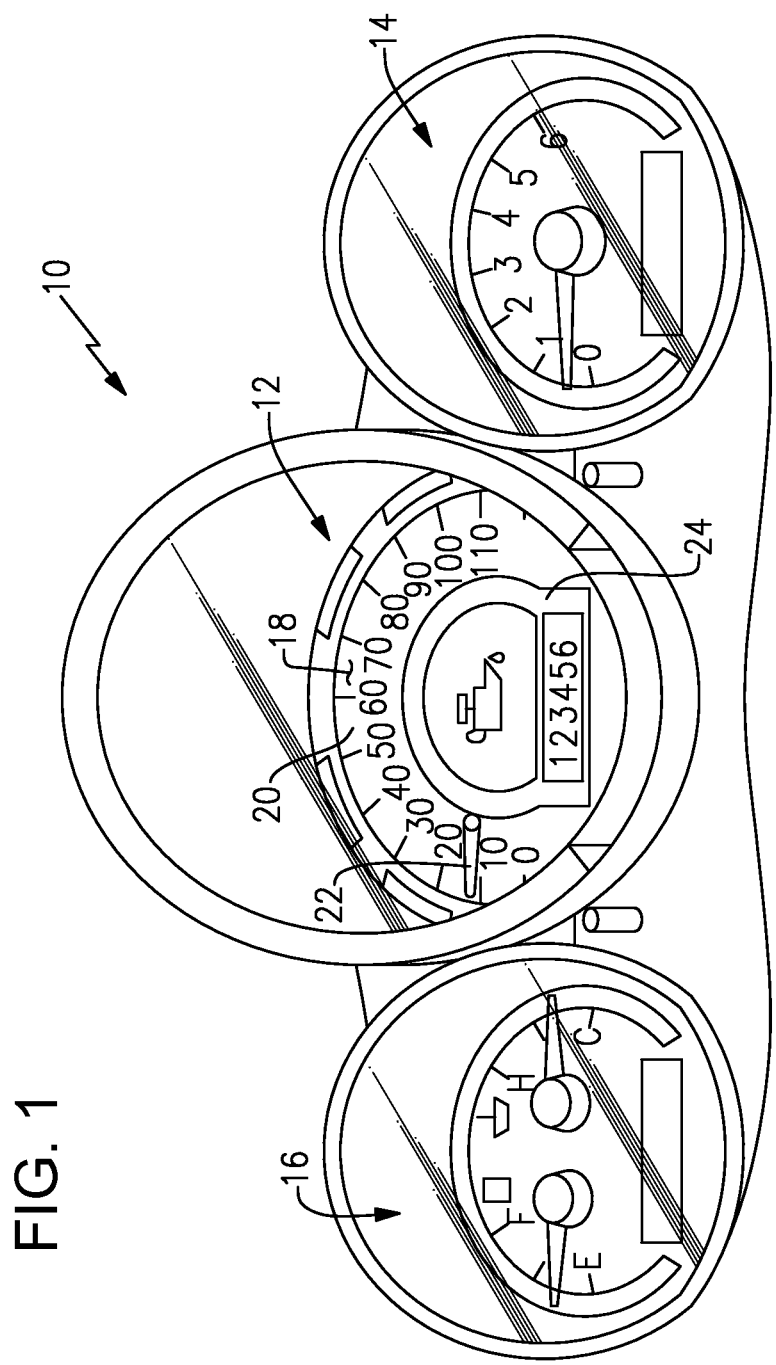
FIG. 1 is a schematic view of a gauge cluster for an instrument panel.

Referring to FIG. 1, an instrument panel 10 includes a plurality of dial gauges 12, 14, 16 that provide information to a vehicle operator indicative of vehicle operating conditions. The example instrument panel 10 includes a center dial gauge 12 that provides an indication of vehicle speed. A second gauge 14 provides an indication of vehicle engine RPM. A third dial gauge 16 is a compound gauge and provides information indicative of vehicle fuel levels and fluid coolant temperatures.

The example dial gauge 12 provides an indication of vehicle speed through the use of a pointer 22 that is rotated relative to a dial face 18. The dial face 18 includes a plurality of markings 20 that are indicative of a vehicle speed. Disposed within a center portion of the dial gauge 12 is a display 24. The example display 24 has a liquid crystal display (LCD). The LCD 24 provides for variable and different types of information to be displayed to a driver according to a preference or a specific desired operation.

Figure 3:
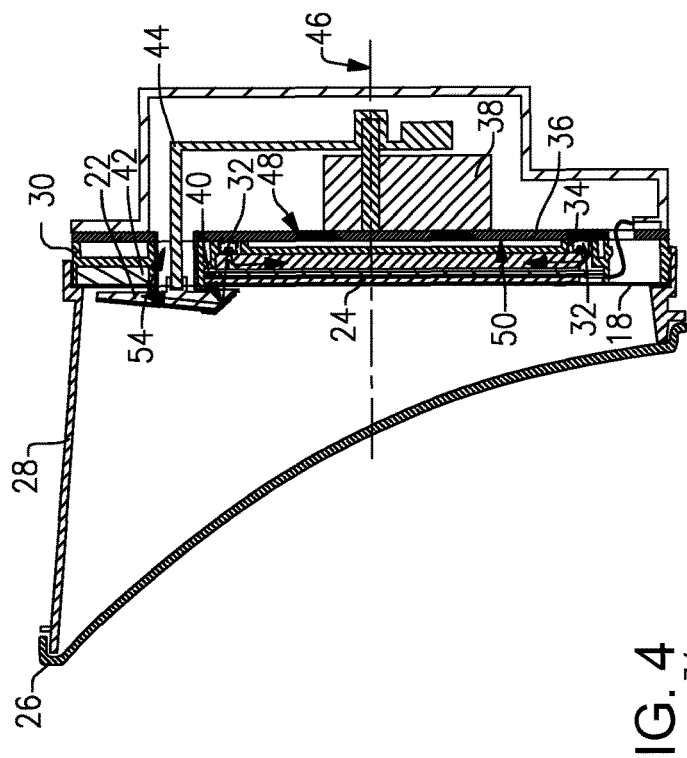
FIG. 3 is a cross section of the example gauge.

Because the LCD 24 is disposed within a center of the dial gauge 12, the pointer 22 cannot extend through the dial face 18 along a rotational axis 46 (FIG. 3). Therefore, the pointer 22 must be provided and constructed in such a way as to provide rotation about the annularly shaped markings 20 that provide an indication to the operator of the vehicle operating conditions. This is accomplished through a motor supporting an arm for rotation about the axis 46.

Figure 4:
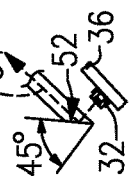
FIG. 4 is another cross-section of the example gauge.
Figure 2:
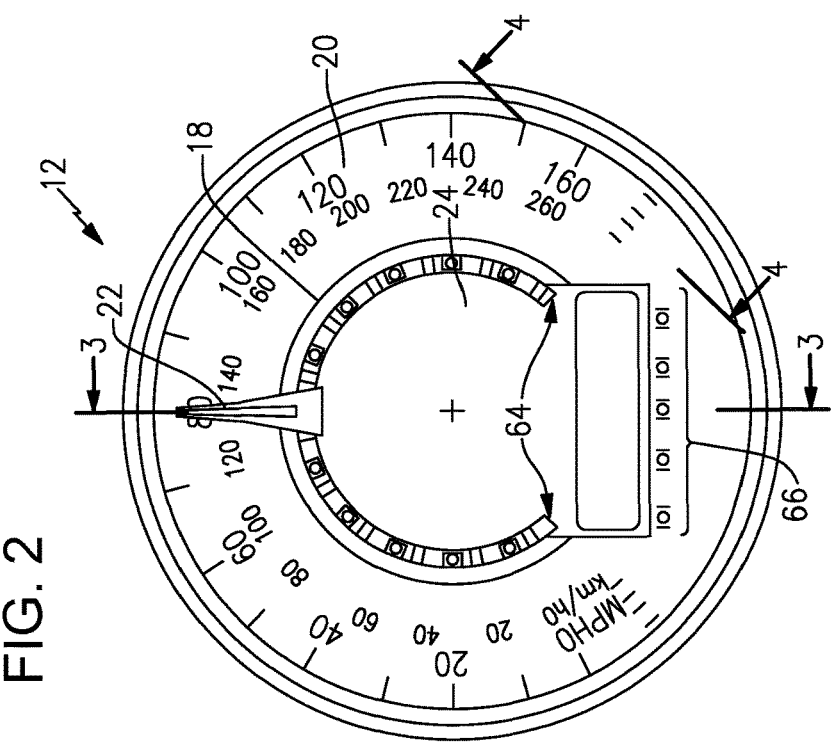
FIG. 2 is a front view of an example gauge including an illuminated pointer.

Referring to FIGS. 2, 3 and 4, the example dial gauge 12 includes the gauge face 18 including the plurality of markings 20 that are indicative of the vehicle speed. The example markings 20 includes a miles per hour scale disposed about an outermost periphery with a kilometers per hour scale disposed radially inward of the miles per hour scale. This configuration is common to speedometer displays used throughout North America. As appreciated, other dial gauge configurations other than that utilized for providing information indicative of a vehicle speed will also benefit from the disclosures discussed herein below.

Disposed within the center section of the dial gauge 12 is the LCD 24. The LCD 24 provides information on various operating parameters that can be displayed as desired or by command of the vehicle operator. Such operations can include oil pressure, fluid levels, odometer readings, trip readings, or any other information that would be utilized and useful for communication to a vehicle operator that is indicative of vehicle operating conditions or position.

The example dial gauge 12 includes an illuminated pointer 22. The illuminated pointer 22 receives light from a plurality of LEDs 32 orientated to illuminate both the LCD 24 and the pointer 22. The LEDs 32 are arranged in a first plurality 64 that is disposed annularly and that corresponds to segments within the LCD 24. A second plurality of LEDs 66 provides back lit illumination of the LCD 24.

Referring to FIG. 3, a cross sectional view of the example dial gauge 12 illustrates that the dial gauge 12 includes the dial surface 18 disposed under a lens 26 that is supported on a mask 28. The mask 28 is, in turn, supported on a gauge housing 30. The gauge housing 30 supports a printed circuit board 36. The printed circuit board 36 provides for mounting of a motor 38 along with the LEDs 32. The LEDs 32 broadcast light through a light guide 34. The example light guide 34 includes reflective surfaces that direct light behind the LCD 24 and that also directs light up into the pointer 22.

The LEDs 32 are mounted on a first side 50 of the circuit board 36. The motor 38 is mounted on a second or back side 48 of the same circuit board 36. Only a single circuit board 36 is required as both the LEDs 32 and the motor 38 are mounted thereon. The LEDs 32 cooperate with the light guide 34 to both illuminate the LCD 24 and the pointer 22. A separate light guide 42 is orientated to an outward radial position relative to the light guide 34 to illuminate the outer circumference of the dial gauge 12.

The pointer 22 supported on an arm 44 that is in turn connected to the motor 38. The motor 38 rotates a shaft about the axis 46. Rotation of the shaft is transferred through the arm 44 to the pointer 22. The arm 44 extends through a slot 54 in the circuit board 36 to suspend the pointer 22 in a position above the dial face 18. The reflective surface 40 within the pointer 22 receives light communicated from the LEDs 32 to provide for illumination of the pointer 22.

Referring to FIG. 4, LEDs 32 positioned on the circuit board 36 also direct light off the reflective surface 52 into the light guide 34. Light reflected off the surface 52 is transmitted through the light guide 34 to provide the desired backlighting of the LCD 24.

Figure 5:
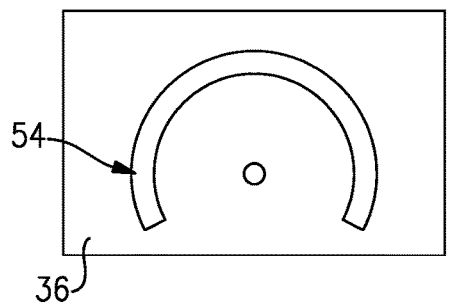
FIG. 5 is a schematic view of an example circuit board.

Referring to FIG. 5, the circuit board 36 includes the annular slot 54 through which the arm 44 extends to suspend and hold the pointer 22 above the dial face 18. The circuit board 36 also provides the single mounting location both for the LEDs 32 and the motor 38. Because the LEDs 32 can illuminate both the LCD 24 and the pointer assembly 22 and are all mounted on the single common circuit board 36, only one circuit board is required and daughter and external extraneous secondary circuit boards are not required. The reduction of the number of circuit boards required also reduces assembly costs along with costs associated with connectors required to provide the desired connections between additional circuit boards.

Figure 6:
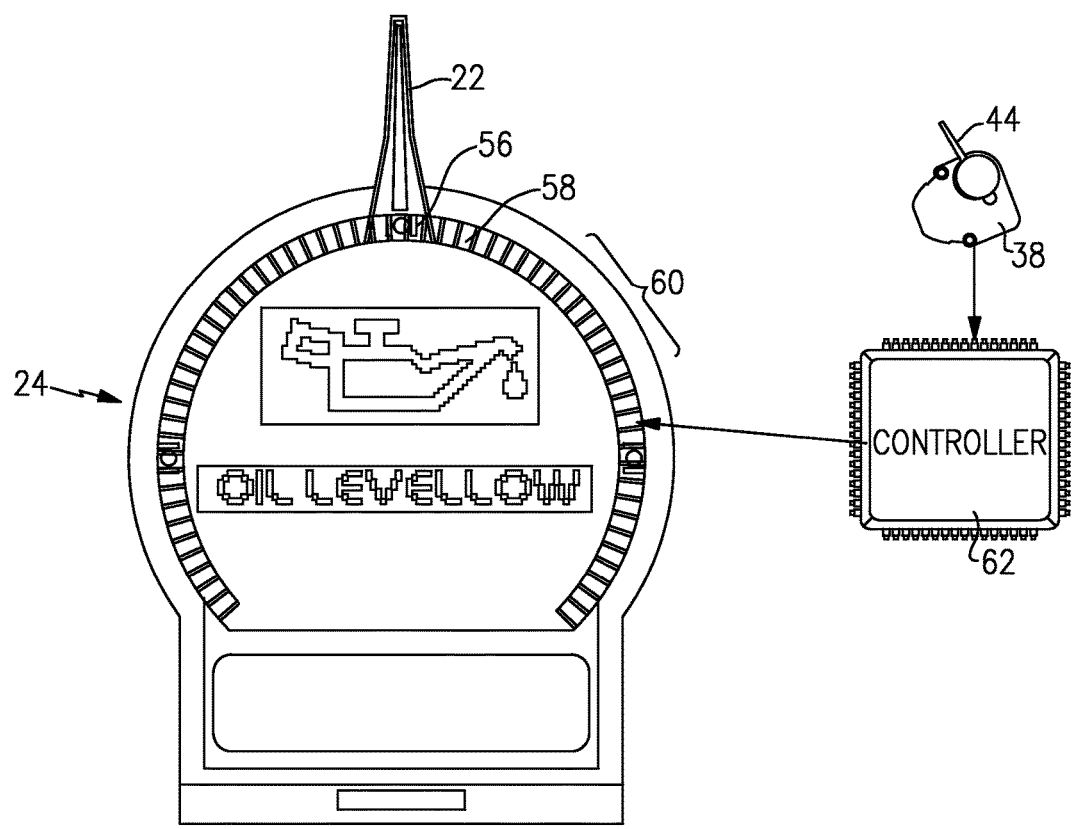
FIG. 6 is a schematic view of an example liquid crystal display for the example gauge assembly.

Referring to FIG. 6, the LCD 24 is shown including a display to provide an indication of oil level. The LCD 24 can also be utilized to provide an indication of odometer readings. Moreover, the example LCD 24 includes a plurality of segments 60 disposed annularly around the exterior portion of the LCD 24. Each of these segments 60 is selectively switchable between an on condition, shown as reference numeral 56, and an off condition, indicated as 58. In the on condition, light is allowed to pass through the LCD 24 and onto the reflective surface 40 of the pointer 22 (FIG. 3). In the off condition light from the LED 32 is not allowed to be transmitted therethrough.

The first plurality of LEDs 64 are arranged to provide for the illumination of the pointer assembly 22 and correspond with each of the plurality of segments 60. A controller 62 utilizes information obtained from the motor 38 to determine a position of the pointer 22. This controller 62 interprets that information and selectively switches on one of the plurality of segments relating to and corresponding to the position of the pointer 22. When the segment is in an on condition as indicated by 56 and disposed directly underneath the pointer 22, light from a corresponding LED 32 is allowed to pass through the LCD 24 and illuminate the pointer 22. Once the pointer 22 passes the on segment 56 that segment is switched off as indicated at 58, and another of the plurality of segments 60 corresponding to a current position of the pointer 22 is opened to provide and allow light from the corresponding LED to be directed into the pointer 22.

Moreover, the plurality of LEDs 64 that are disposed about the circumference of the outer periphery of the LCD 24 may be left continually on such that the opening and closing of the plurality of segments in the LCD 24 are utilized to selectively switch and illuminate the pointer 22. As appreciated, therefore control of each individual LED 32 is not required. As control of the LCD 24 is already required for to display the varying images desired by an operator additional electronics and controls are not required to be attached to the corresponding LEDs in order to properly illuminate the pointer 22 as is desired.

Referring to FIGS. 7 and 8, another example dial gauge assembly 70 includes the LCD 24 along with a first plurality of LEDs 76 provided to illuminate the pointer 22. A second plurality of LEDs 78 are arranged to provide illumination for the LCD 24. The first plurality and second plurality of LEDs 76, 78 are isolated from each other such that each group of LEDS can be actuated independently. In this example, a separate set of LEDs are utilized and isolated to provide illumination to the pointer 22. The second plurality of LEDs 78 provides illumination and backlighting of the LCD 24 only.

In this example, a light guide 72 is disposed behind the LCD 24 and includes a plurality of reflective surfaces 74 that correspond with a plurality of LEDs 78. The LEDs 78 direct light into the light guide 72 which then distributes that light uniformly about the back side of the LCD 24. As in the previous example the LEDs 76 and 78 are all mounted on a common circuit board. The motor 38 is also mounted on the same circuit board eliminating the need for multiple circuit boards. Moreover, the example pointer 22 is also suspended on an arm 44 that extends through a groove within the circuit board 36. The pointer 22 is therefore suspended above the dial face 18 to provide an indication of a current vehicle operating condition.

In this example the plurality of LEDs 76 can be of a color different than the plurality of LEDs 78. The different colors are possible due to the separate and isolated nature of the two pluralities of LEDs. In this example, the LEDs are separated by a housing 80 that provides for the isolation of light so that light from the first plurality of LEDs 76 that are intended for illumination of the pointer assembly 22 do not mix and illuminate the LCD 24.

The example light guides 72 and 34 (FIG. 3) provide a compact and relatively thin dial illumination configuration such that the entire assembly can be reduced in size. The reduction in size is provided by the lighting configuration provided by the use of a single circuit board possible with the use of the light guides 72 and 34 that direct light as is desired.

Figure 9:
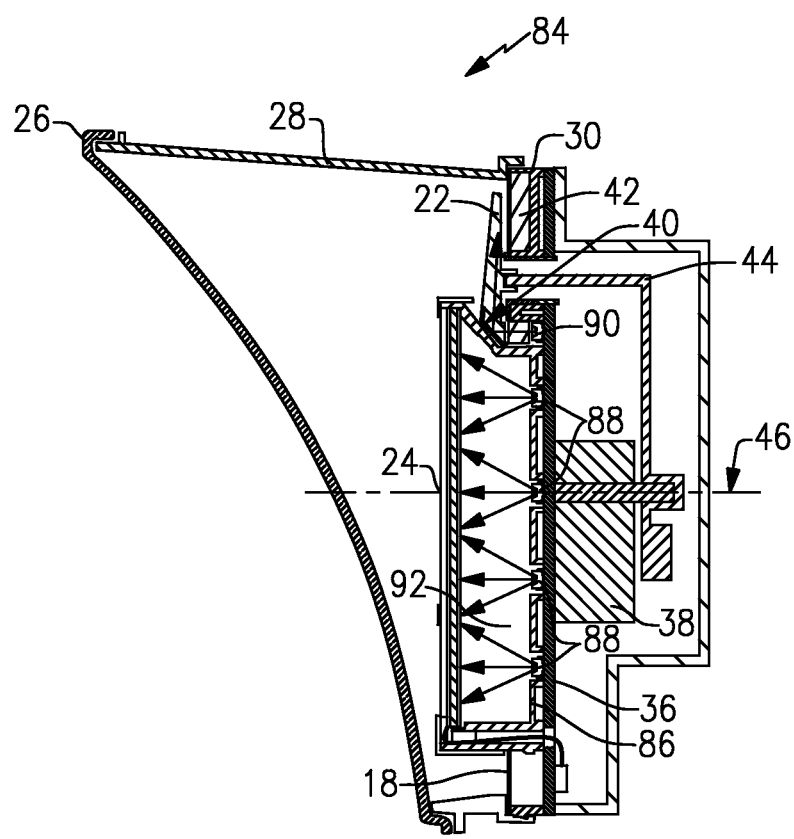
FIG. 9 is a cross-sectional view of another example gauge assembly.

Referring to FIG. 9, another example dial gauge 84 includes a light housing 86 that supports the LCD 24 a distance from the circuit board 36. The light housing 86 also provides for the separation of light from first plurality of LEDs 88 that is utilized for backlighting the LCD 24 from a second plurality of LEDs 90 utilized for illuminating the pointer assembly 22. A space 92 is provided between the plurality of LEDs 88 and the back of the LCD 24. The space between the LEDs 88 and the rear surface of the LCD 24 provides for the spreading of light rays within the housing 86 to provide a uniform distribution of light along the backside of the LCD 24.

The example LCD 24 is raised a distance from the dial face 18. The distance between the dial face 18 and the face of the LCD 24 provides a desired aesthetic appearance to the gauge assembly 84. The circuit board 36 supports both pluralities of LEDs 88 and 90 along with the motor 38 to provide for the use of a single circuit board 36 for illuminating both the pointer 22 and the LCD 24.

Referring to FIGS. 10 and 11, another example dial gauge assembly 96 includes a plurality of LEDs 104 that direct light through a light guide 106 to illuminate both the LCD 24 and the pointer assembly 98. In this example, an electroluminescent sheet 110 provides for illumination of the outer periphery of the dial gauge face 18. The electroluminescent sheet 110 generates light by applying a small electric current to a phosphorescent material. The current causes the phosphorescent material to glow and provide the desired illumination. The color and intensity of light generated by the electroluminescent sheet 110 provide the desired appearance and light levels tailored to the individual application.

In this example, a single plurality of LEDs 112 direct light perpendicular to the axis 46 through the light guide 106. The light guide 106 in turn provides the back lighting required to illuminate the LCD 24. The example light guide 106 is tapered to encourage light waves to rebound and impact sides of the light guide along from the bottom portion where light emitted from an LED 104 is emitted through a light guide 106. A light housing 108 supports the light guide 106 and controls light emission from the light guide 106. From this initial entry portion, the light guide 106 tapers such that light is continually contacting the outer surfaces to provide a uniform illumination utilized to back light the LCD 24. The example light housing 108 tapers to correspond to the shape of the light guide. At an end 116 opposite a light receiving surface 114 of the light guide 106, light exits and is emitted into the pointer 98. The example pointer 98 includes the reflective surface 100 that receives light and directs that light radially outward to provide the desired illuminated appearance.

In this example, an arm 102 extends about the outer periphery of the circuit board 36. The example arm 102 is an integral portion of the pointer 98 and extends about the outer periphery of the circuit board 118. As appreciated, because there is no slot in the example circuit board 36 the LED 104 and the electroluminescent sheet 110 can be electrically wired to the devices on the circuit board 118 used to power and illuminate the desired pointer 98 and LCD 24. This in addition to supporting the motor 38 that moves the pointer 98 relative to the dial face 18.

Accordingly, the example dial gauge assemblies 12 include a pointer and LCD that are both illuminated by LEDs mounted to a single circuit board. Additionally, the motor is also mounted to the single common circuit board such that the number of parts is reduced and assembly simplified. Further, the LCD includes segments that control how light is transmitted into the pointer as the pointer rotates relative to the dial face.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A gauge assembly, comprising:
   a dial surface including markings indicative of a vehicle operating parameter;
   a display device configured to display information digitally, the display device being disposed adjacent to the dial surface;
   a pointer needle rotatable about an axis over the dial surface movable to indicate an operating parameter on the dial surface, the axis passing through the display device;
   an arm device connected to the pointer needle, the arm device being in mechanical communication with an actuation device, the arm device passing from the pointer needle to the actuation device in a path that is nonintersecting with the display device;
   at least one light source configured to illuminate the display device and the pointer needle; and
   a single circuit board supporting the at least one light source, the single circuit board defining an annular slot through the single circuit board, the arm device extending through the annular slot of the single circuit board.

2. The gauge assembly according to claim 1, further comprising a motor, the motor configured to rotate a shaft, the shaft connected to the arm device; and
   wherein the single circuit board has a side on which the at least one light source is mounted and an opposite side; and
   wherein the motor is supported on the opposite side of the single circuit board such that the shaft extends away from the single circuit board.

3. The gauge assembly according to claim 1, wherein the display device includes a liquid crystal display having a plurality of segments to be switched between an on condition allowing light to pass through the display device and an off condition blocking light from passing through the display device.

4. The gauge assembly according to claim 3, wherein light for illuminating the pointer needle is selectively passed through one of the plurality of segments in the display device corresponding to a position of the pointer needle.

5. The gauge assembly according to claim 4, wherein the at least one light source is a plurality of light sources corresponding to the plurality of segments, and each of the plurality of segments is selectively switched to the on condition allowing light to pass through the display device and onto a reflective surface of the pointer needle.

6. The gauge assembly according to claim 1, which further comprises a light guide for directing light from the at least one light source to illuminate the display device and the pointer needle.

7. The gauge assembly according to claim 6, wherein the light guide includes a plurality of corresponding reflective surfaces for directing light onto a back side of the display device.

8. The gauge assembly according to claim 1, wherein the at least one light source includes a first plurality of lights for illuminating the display device and a second different plurality of lights for illuminating the pointer needle.

9. The gauge assembly according to claim 1, which further comprises a light guide for directing light from the at least one light source to illuminate the display device and the pointer needle, the light guide including a plurality of reflective surfaces for directing light onto a back side of the digital display device.

10. The gauge assembly according to claim 1, wherein the at least one light source comprises a plurality of lights arranged annularly.

11. The gauge assembly according to claim 1, wherein the at least one light source is arranged to follow the annular slot.

12. A gauge assembly for a motor vehicle, the gauge assembly comprising:
a dial face including a plurality of markings indicative of a vehicle operating parameter;
a pointer needle rotatable about an axis over the dial face for indicating a current vehicle operating condition represented by one of the plurality of markings;
a liquid crystal display device centered on the axis for displaying information, the liquid crystal display having no pass-through hole intersecting with the axis;
at least one light source for illuminating the liquid crystal display and the pointer needle;
a motor, the motor configured to rotate a shaft, the shaft connected via an arm to the pointer needle; and
a single circuit board supporting the motor and the at least one light source, wherein the at least one light source is attached to a first side of the single circuit board and the motor is attached to a second side of the single circuit board, the second side being opposite to the first side, wherein the motor is positioned such that the shaft extends away from the single circuit board.

13. The gauge assembly according to claim 12, wherein the pointer needle has a reflective surface, and the liquid crystal display includes a plurality of segments switchable between an on condition allowing light to pass therethrough and onto the reflective surface and an off condition preventing light from passing therethrough.

14. The gauge assembly according to claim 13, wherein the at least one light source includes a first plurality of light sources corresponding to the plurality of segments for illuminating the pointer needle.

15. The gauge assembly according to claim 12, wherein the single circuit board has a slot and the motor has an arm extending through the slot, the arm supporting the pointer needle above the dial face.

16. The gauge assembly according to claim 12, including a light guide configured to receive light from the at least one light source and to direct light to a back side of the liquid crystal display and to the pointer needle.

17. The gauge assembly according to claim 12, wherein the at least one light source includes a first plurality of light sources for illuminating the pointer needle and a second plurality of light sources for illuminating the liquid crystal display.

18. The gauge assembly according to claim 17, wherein the single circuit board has a top side and a bottom side, the at least one light source being mounted to the top side of the single circuit board and the motor being mounted to the bottom side of the single circuit board.

19. A gauge assembly, comprising:
a dial surface including markings indicative of a vehicle operating parameter, the dial surface forming a slot therein;
a pointer needle rotatable about an axis of rotation, the pointer needle being movable about the axis of rotation to indicate an operating parameter on the dial surface;
an arm extending through the slot and connected to the pointer needle, the slot being spaced apart from the axis of rotation;
a digital display device configured to display information digitally, the digital display device being disposed over the axis of rotation;
a plurality of light sources configured to illuminate the digital display device and the pointer needle;
a motor configured to rotate the pointer needle;
a controller; and
a single circuit board supporting the plurality of light sources and the motor,
wherein the controller is configured to:
access information obtained from the motor;
determine, based on the information obtained from the motor, a position of the pointer needle; and
control light to the pointer needle based on the determined position of the pointer needle.

20. The gauge assembly according to claim 19, wherein the digital display device includes a liquid crystal display having a plurality of segments to be switched between an on condition allowing light to pass through the digital display device and an off condition blocking light from passing through the digital display device, wherein light for illuminating the pointer needle is selectively passed through one of the plurality of segments in the digital display device corresponding to a position of the pointer needle.

21. The gauge assembly according to claim 19, wherein at least some of the plurality of light sources are configured to illuminate the pointer needle and generate light regardless of the position of the pointer needle;
wherein the digital display device comprises a plurality of segments, each of the plurality of segments being selectively switchable between an on condition whereby light is allowed to pass through and an off condition whereby light is not allowed to be passed through; and
wherein the controller is configured to control light to the pointer needle based on the determined position of the pointer needle by:
determining, based on the determined position of the pointer needle, a particular segment to switch to the on condition;
configure the particular segment to switch to the on condition; and
configure a remainder of the plurality of segments to switch to the off condition.

* * * * *